(12) United States Patent
Jung et al.

(10) Patent No.: US 9,120,292 B2
(45) Date of Patent: Sep. 1, 2015

(54) MANUFACTURING METHOD OF VEHICLE TAILGATE INNER PANEL

(71) Applicants: Hyundai Motor Company, Seoul (KR); Kia Motor Corporation, Seoul (KR); Seojin Industrial Co., Ltd., Gunpo, Gyeonggi-do (KR)

(72) Inventors: Youn-Il Jung, Gyeonggi-do (KR); Heung-Jun Oh, Gyeonggi-do (KR); Sang-Il Lee, Gyeonggi-do (KR); Young-Hyun Kim, Incheon (KR)

(73) Assignees: Hyundai Motor Company, Seoul (KR); Kia Motors Corporation, Seoul (KR); Seojin Industrial Co., Ltd., Gunpo, Gyeonggi-do (KR)

( * ) Notice: Subject to any disclaimer, the term of this patent is extended or adjusted under 35 U.S.C. 154(b) by 125 days.

(21) Appl. No.: 13/718,782

(22) Filed: Dec. 18, 2012

(65) Prior Publication Data
US 2013/0302634 A1    Nov. 14, 2013

(30) Foreign Application Priority Data
May 9, 2012  (KR) .......................... 10-2012-0049329

(51) Int. Cl.
*B32B 15/01* (2006.01)
*B32B 3/08* (2006.01)
*B23P 17/00* (2006.01)
*B21D 22/20* (2006.01)
*B21D 39/03* (2006.01)

(52) U.S. Cl.
CPC .............. *B32B 15/01* (2013.01); *B21D 22/203* (2013.01); *B21D 39/031* (2013.01); *B23P 17/00* (2013.01); *B32B 3/085* (2013.01); *Y10T 29/49826* (2015.01); *Y10T 29/49908* (2015.01); *Y10T 428/12396* (2015.01)

(58) Field of Classification Search
CPC ...... B32B 15/01; B32B 3/085; B21D 22/203; B21D 39/031; B23P 17/00; Y10T 29/49826; Y10T 29/49908; Y10T 29/49945; Y10T 29/49904; Y10T 29/49968; Y10T 29/49833; Y10T 428/12396
USPC .............. 29/525, 428, 469, 525.14, 505, 432; 428/601
See application file for complete search history.

(56) References Cited

FOREIGN PATENT DOCUMENTS

| JP | 2001122154 A | 5/2001 |
|---|---|---|
| KR | 10-2002-0028233 | 4/2002 |
| KR | 10-0468258 B1 | 1/2005 |
| KR | 10-2009-0091910 | 8/2009 |

*Primary Examiner* — John C Hong
(74) *Attorney, Agent, or Firm* — Mintz Levin Cohn Ferris Glovsky and Popeo, P.C.; Peter F. Corless

(57) ABSTRACT

Disclosed herein is a method of manufacturing an inner panel of a vehicle tailgate, which is formed in a bending plate shape and to which reinforcing members are coupled to improve rigidity, including: temporarily coupling a plurality of sub-blanks to a main blank by spot welding; forming the main blank into an inner panel and the plurality of sub-blanks into a plurality of reinforcing members, using a forming mold; and permanently coupling the plurality of reinforcing members to the inner panel.

3 Claims, 6 Drawing Sheets

SPOT WELDING

PLACE WHERE BLANKS TO BE REINFORCING MEMBERS ARE DISPOSED

MANUFACTURING METHOD OF VEHICLE TAILGATE INNER PANEL

CROSS-REFERENCE TO RELATED APPLICATION

The present application claims priority to Korean Patent Application No. 10-2012-49329, filed on May 9, 2012, the entire contents of which is incorporated herein for all purposes by this reference

BACKGROUND (a) Technical Field

The present invention relates to a method of manufacturing an inner panel of a vehicle tailgate (hereafter, inner panel), and more particularly, to a method of manufacturing an inner panel of a vehicle tailgate designed to reduce the manufacturing time and cost by simultaneously forming a reinforcing member and an inner panel.

(b) Background Art

Sport Utility Vehicles (SUVs) or Recreational Vehicles (RVs) are equipped with a tailgate at the back of the vehicle to increase of the interior space and facilitate easy loading of cargo into the vehicle.

The tailgate is pivotally connected to the back of the vehicles to open and close. Therefore, a reinforcing member for enhancing rigidity is mounted on the tailgate to prevent deformation of the tailgate due to repeated opening and closing motions and to protect the vehicle in a rear collision. The reinforcing member is disposed between an inner panel and an outer panel of the tailgate, in a plate shape with a predetermined size and shape, and generally welded to the inner panel, as shown in FIG. 1.

Thus, according to the methods of manufacturing inner panels of the related art, as shown in FIG. 2, an inner panel 1a and partial reinforcing members 2a, 3a, 4a, 5a, and 6a are manufactured separately and then welded together. In other words, a total of six blanks of 1, 2, 3, 4, 5, and 6 are separately manufactured by the reinforcing members 2a, 3a, 4a, 5a, and 6a and the inner panel 1a, and then seated and welded on a jig for assembly.

Moreover, to manufacture the partial reinforcing members 2a, 3a, 4a, 5a, and 6a separately from the inner panel 1a, several steps are necessary including forming (or drawing) the parts with a press having a forming mold, trimming to cut off unnecessary parts (e.g., scraps) to create the finished product using a trimming mold (e.g., cutting mold), piercing the product to make a bore, and flanging to make additional shapes for welding. In other words, the inner panel and the reinforcing members are produced by forming, cutting, boring, and bending the blanks.

In these processes, the forming is a process that machines the blanks 1, 2, 3, 4, 5, and 6 according to the product design data and is the most important process determining the quality of the finished product.

As shown in FIG. 3, the apparatus for the forming process is equipped with a mold composed of a lower mold 20 conforming to the shape of the bottom of the inner panel or the reinforcing members (to be produced) and an upper mold 10 conforming to the shape of the top of the inner panel or the reinforcing members (to be produced). A blank is placed between the upper mold 10 and the lower mold 20, with the upper mold 10 open (e.g., raised), and as the upper mold 10 closes (e.g., lowers toward the lower mold) and presses the blank with a predetermined pressure, the blank is formed according to the shape of the inner panel or the reinforcing member.

Further, the formed blank is removed when the upper mold 10 is raised. The removed blank is trimmed, pierced, and flanged, as described above, and then assembled and welded with other parts, thereby manufacturing one finished inner panel.

The description provided above as a related art of the present invention is just for helping understanding the background of the present invention and should not be construed as being included in the related art known by those skilled in the art.

SUMMARY

The present invention provides a method of manufacturing an inner panel of a vehicle tailgate which may reduce the manufacturing time and the number of necessary molds and decrease the defective portion due to assembly tolerances.

Furthermore, the present invention provides a method of manufacturing an inner panel of a vehicle tailgate, which is formed in a bending plate shape and to which reinforcing members are coupled to improve rigidity, including: temporarily coupling sub-blanks, to be formed into reinforcing members, to a main blank, to be formed into an inner panel; forming the main blank into the inner panel and the sub-blanks into reinforcing members, using a forming mold; and permanently coupling the reinforcing members to the inner panel.

The reinforcing members and the inner panel are permanently coupled by clinching that forces the reinforcing members and the inner panel into a space between a fixing die having a groove and a clinching punch so a portion of the part pressed by the clinching punch is pushed into the part in close contact with the fixing die. The main blank and the sub-blanks are temporarily coupled by spot welding.

At least two sub-blanks are temporarily coupled to the main blanks, and the formed inner panel is inserted into a cutting mold and trimmed therein to remove scraps formed at the corners, the fixing die and the clinching punch are mounted in the cutting mold, and the inner panel is trimmed and clinched simultaneously.

[NOTE: This section was moved to the Detailed Description below.]

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
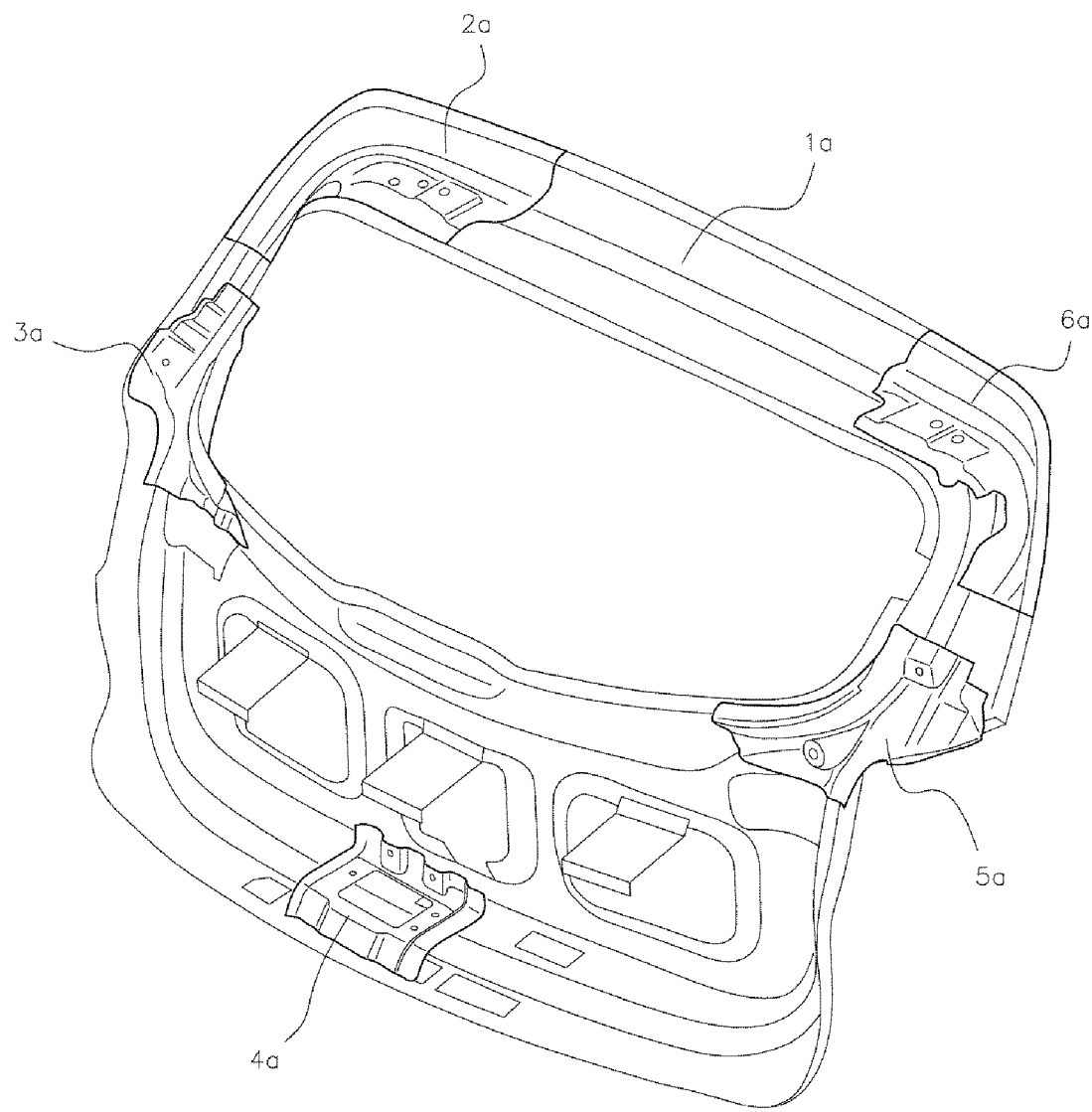
FIG. 1 is an exemplary view of an inner panel of a tailgate for a vehicle where reinforcing members are coupled according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

A method of manufacturing an inner panel of a vehicle tailgate according to an exemplary embodiment of the present invention is described hereafter in detail with reference to the accompanying drawings. The inner panel described herein is not limited in the number of reinforcing members to be coupled, but it is assumed that five reinforcing members are coupled and have the same or similar shapes, as manufactured by the methods of the related art, for the convenience of description.

In a manufacturing method according to the present invention, a main blank 1 to be formed into an inner panel and a plurality of sub-blanks 2, 3, 4, 5, and 6 to be formed into a plurality of reinforcing members may be permanently coupled, after the parts (e.g., one main blank and five sub-blanks) are simultaneously formed, unlike the conventional method of forming the parts separately.

Figure 2:
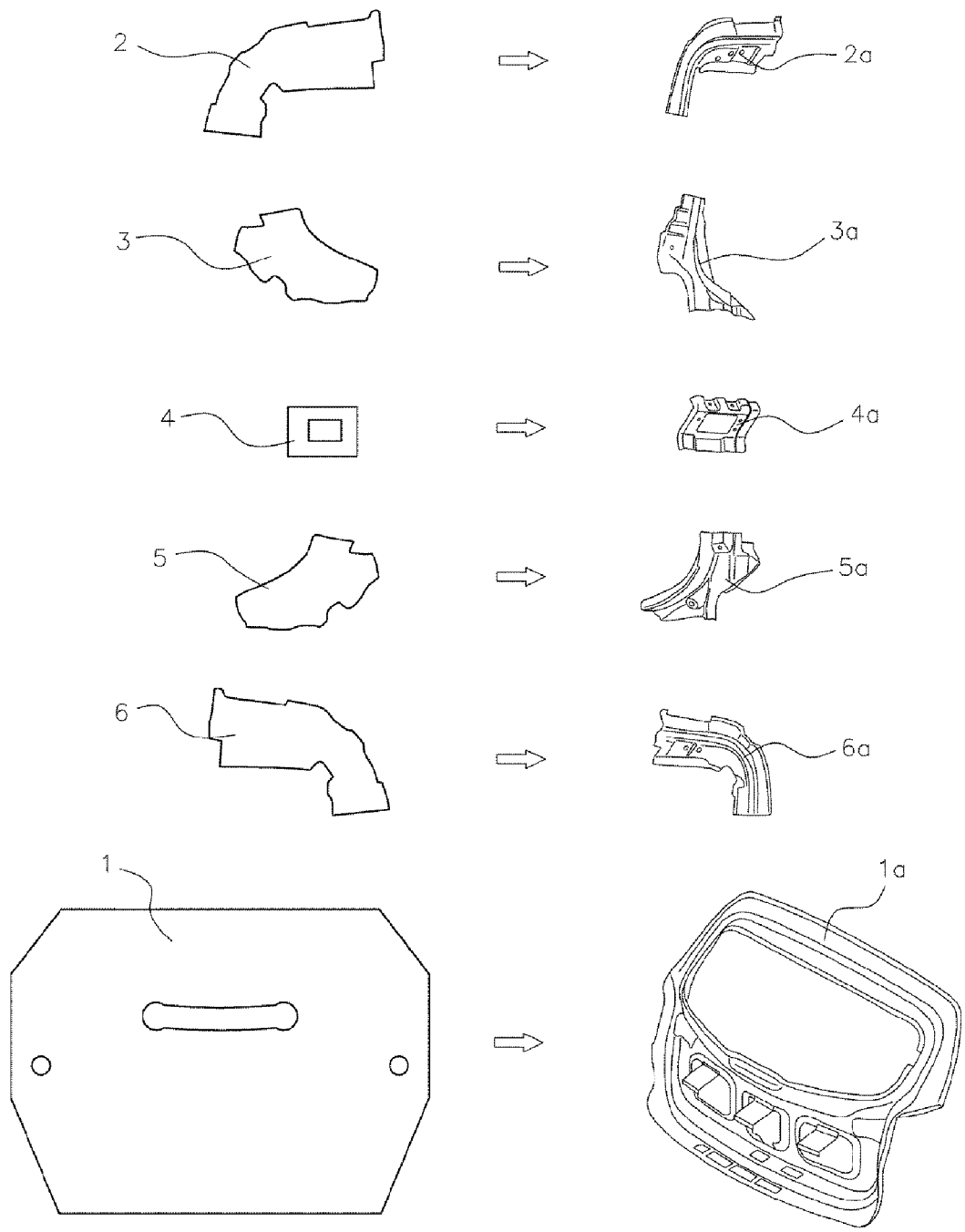
FIG. 2 is an exemplary view showing the shapes of blanks before manufactured as reinforcing members and an inner panel, and an inner panel and a reinforcing member made of the blanks according to the related art.
Figure 3:
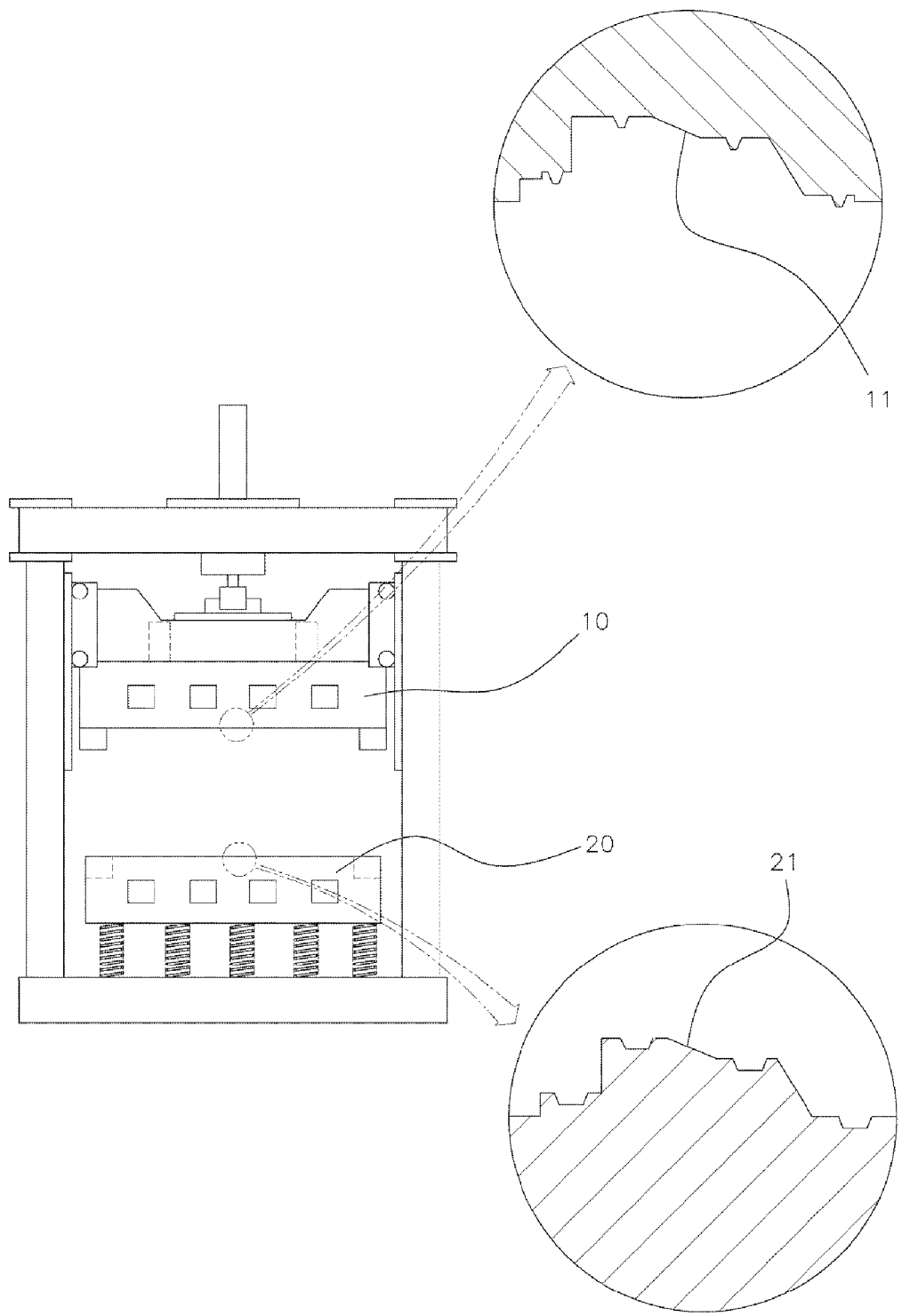
FIG. 3 is an exemplary view showing a forming apparatus equipped with a forming mold according to the related art.

A temporary coupling force to fix the positions of the sub-blanks 2, 3, 4, 5, and 6 in the forming mold may be used to analyze and calculate the necessary shapes, positions, and pressure for the forming mold and the forming temperature. In other words, cracks may be formed by deformation of the materials, as the main blanks 1 and the sub-blanks 2, 3, 4, 5, and 6, which are steel plates, are machined between the upper mold 10 and the lower mold 20, as shown in FIG. 1-3. In addition, the position of a bore, in which a bolt is inserted during the piercing process may be determined at a portion with the smallest deformation by means of forming analysis.

Figure 4:
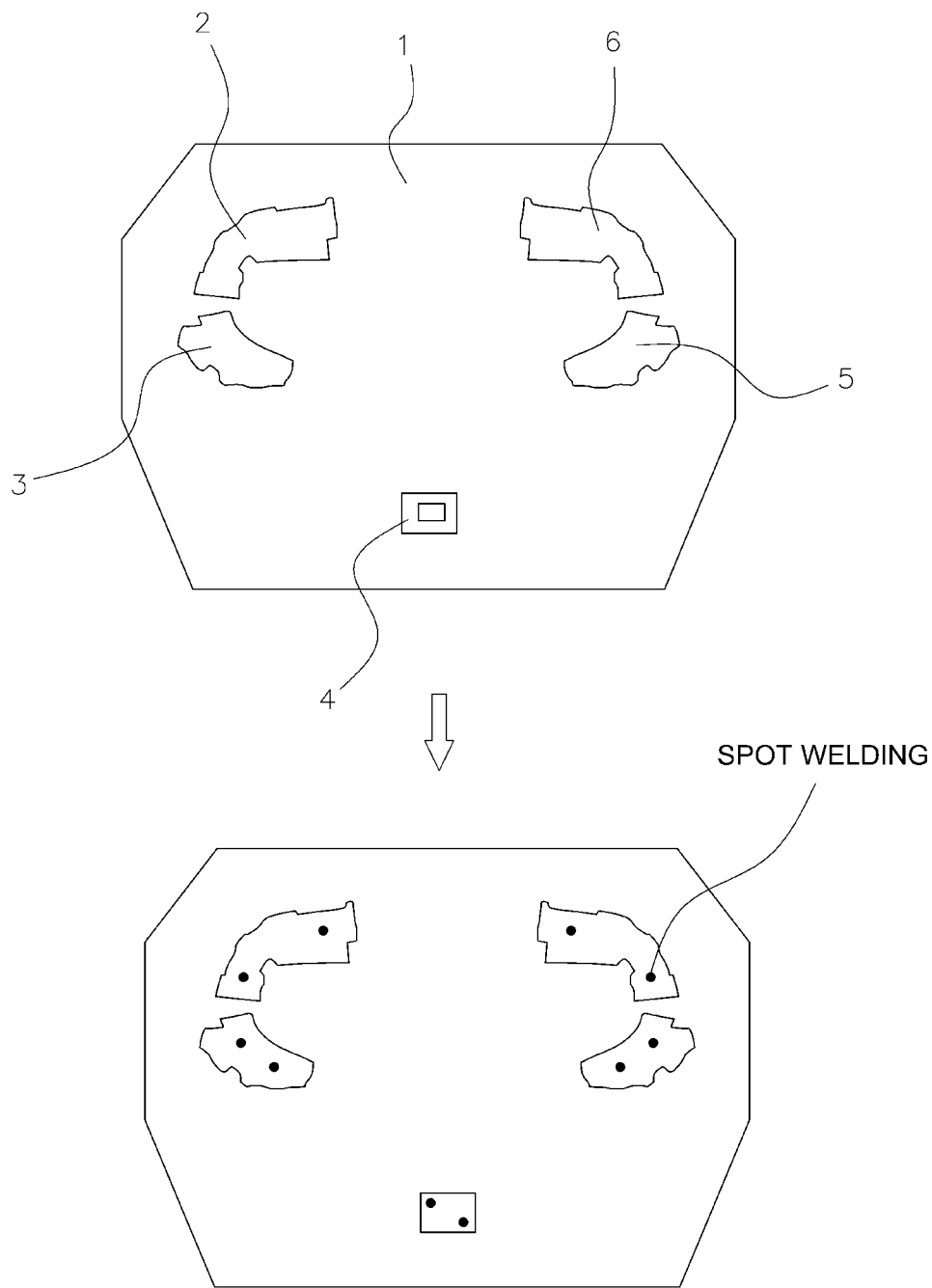
FIG. 4 is an exemplary view showing a sub-blank placed on a main blank and temporarily coupled by spot welding, according to an exemplary embodiment of the present invention.

Thereafter, when the main blank 1 and the sub-blanks 2, 3, 4, 5, and 6 are manufactured based on the result of forming analysis, the manufactured blanks 1, 2, 3, 4, 5, and 6 may be temporarily coupled by spot welding, as shown in FIG. 4.

Figure 5:
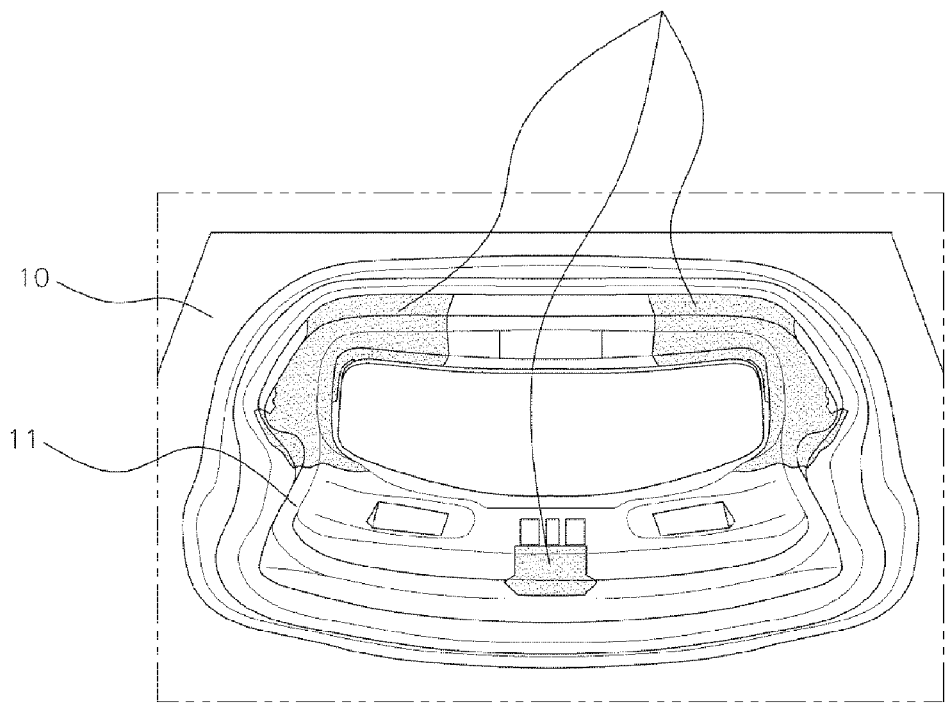
FIG. 5 is an exemplary view showing relief and intaglio patterns on the upper mold, taking the shapes of an inner panel and a reinforcing member, according to an exemplary embodiment of the present invention.

Further, the main blank 1 temporarily coupled with the sub-blanks 2, 3, 4, 5, and 6 may be molded by the forming mold. The forming mold used for the present invention may be manufactured according to the different thickness of the parts, as shown in FIG. 5, due to the overlap of the main blank 1 and the sub-blanks 2, 3, 4, 5, and 6.

Figure 6:
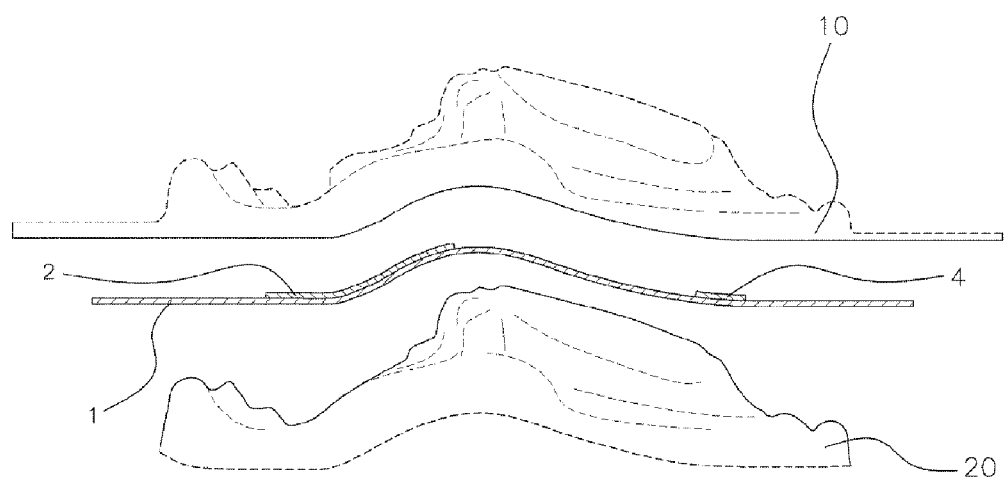
FIG. 6 is an exemplary view showing the process of closing an upper mold to simultaneously form a main blank and a sub-blank according to an exemplary embodiment of the present invention.

The forming mold used for the present invention may comprise a lower mold 20 and an upper mold 10, as shown in FIG. 6, and relief and intaglio patterns may be formed on the top of the lower mold 20 and the bottom of the upper mold 10, respectively, to form the shapes of the main blank 1 and the sub-blanks 2, 3, 4, 5, and 6. The patterns may be formed according to the differences in thickness of the blanks 1, 2, 3, 4, 5, and 6, as described above. Further, the lower mold 20 may be fixed to a press and the upper mold 10 may be in close contact with or substantially spaced from the lower mold 20 to open and close on the blanks.

Thus, the main blank 1 temporarily coupled by a temporary welding process with the sub-blanks 2, 3, 4, 5, and 6 may be disposed between the lower mold 20 and the upper mold 10, and the sub-blanks 2, 3, 4, 5, and 6 and the main blank 1 may be formed into the shapes of the reinforcing members and the inner panel.

After the forming is complete, the main blank 1 and the sub-blanks 2, 3, 4, 5, and 6 may be trimmed to remove the scraps, pierced to form bores, and flanged to form flanges for welding to a vehicle body, thereby manufacturing a finished product. The manufacturing process of the present invention may further include a step of permanently and more firmly coupling the main blank 1 and the sub-blanks 2, 3, 4, 5, and 6. In other words, the present invention may include a step of permanently coupling the inner panel formed from the main blank 1 and the reinforcing members formed from the sub-blanks 2, 3, 4, 5, and 6.

In an embodiment of the present invention, the reinforcing members (e.g., sub-blanks) and the inner panel (e.g., main blank) may be permanently coupled by clinching. In particular, when the reinforcing member and the inner panel temporarily coupled, are disposed between a fixing die 30 having a groove 31 and a clinching punch 41 spaced from the groove 31, the two parts (e.g., inner panel and reinforcing members) may be pressed together and the clinching punch 41 of the clinching core 40 may move vertically into the groove 31, thereby permanently coupling the parts. In this process, a portion of any one of the reinforcing members and inner panel may be pushed into the other part of the reinforcing members and the inner panel and may be permanently coupled by plastic deformation.

Figure 7:
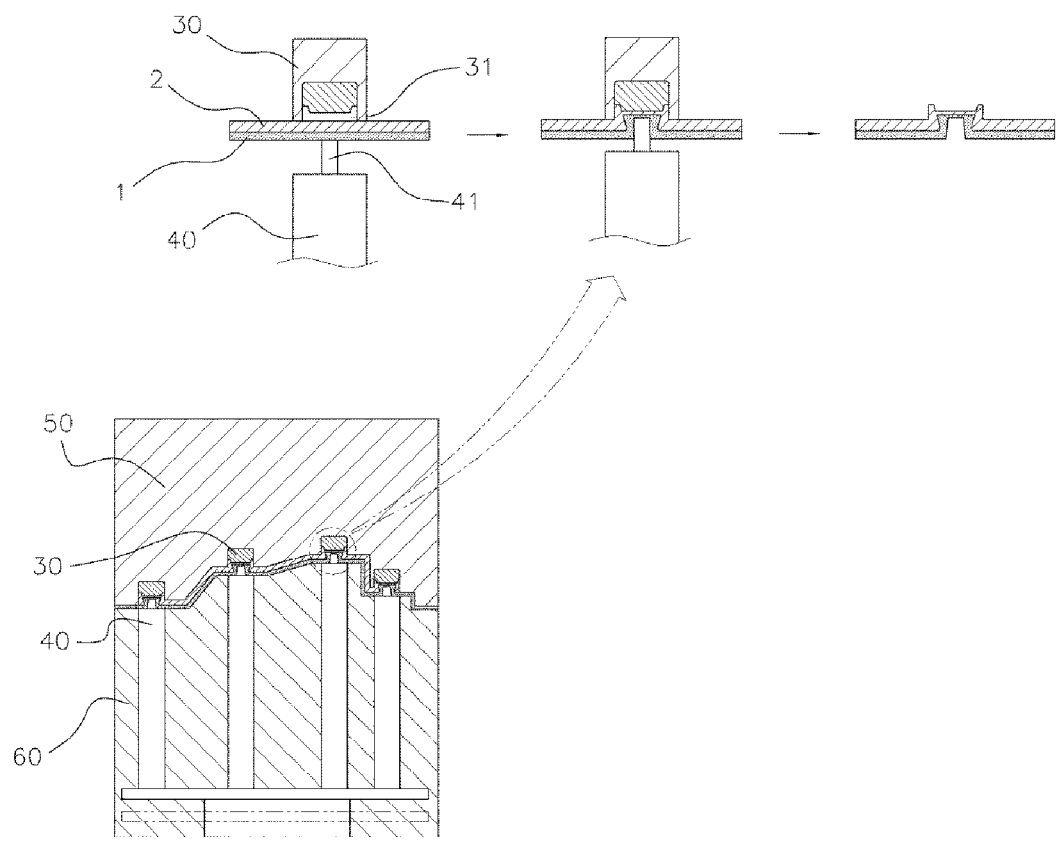
FIG. 7 is an exemplary view showing when a main blank and a sub-blank are permanently coupled by a fixing die and a clinching punch mounted on an upper mold plate and a lower mold plate of a cutting mold according to an exemplary embodiment of the present invention.

In an exemplary embodiment of the present invention, the clinching core 40 including the clinching punch 41 and the fixing die 30 with the groove 31 may be integrally formed respectively in the upper mold plate 50 and the lower mold plate 60 of the cutting mold. In other words, as shown in FIG. 7, the fixing die 30 may be disposed on the upper mold plate 50 of the cutting mold and the clinching core 40 may be disposed on the lower mold plate 60 of the cutting mold so trimming and clinching for the inner panel may be performed simultaneously.

The present invention may reduce the number of forming molds required to form the parts and may decrease the number of manufacturing processes, by integrally forming a main blank (to be formed into an inner panel) with sub-blanks (to be formed into reinforcing members). In addition, since the main blank and the sub-blanks may be permanently coupled by clinching in a trimming process, welding may be omitted. The fixing die and the clinching punch for clinching may be integrally mounted in the cutting mold for trimming, so clinching and trimming may be performed simultaneously, thus further reducing the manufacturing cost.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A method of manufacturing an inner panel of a vehicle tailgate, comprising:
   temporarily coupling a plurality of sub-blanks to a main blank by a temporary welding process;
   forming the main blank into an inner panel and the plurality of sub-blanks into a plurality of reinforcing members, using a forming mold; and
   permanently coupling the plurality of reinforcing members to the inner panel, using a cutting mold,
   wherein the permanently coupling the plurality of reinforcing members comprises: clinching the plurality of reinforcing members and the inner panel into a space between a fixing die having a groove and a clinching punch on a clinching core to push the plurality of reinforcing members into inner panel,
   wherein the fixing die is disposed on an upper mold plate of the cutting mold and the clinching core is disposed on a lower mold plate of the cutting mold so as to trim and clinch the inner panel simultaneously.

2. The method of claim 1, wherein the temporary welding process is spot welding.

3. The method of claim 1, wherein at least two sub-blanks are temporarily coupled to the main blanks.

\* \* \* \* \*